United States Patent
Bender et al.

(10) Patent No.: US 9,856,355 B2
(45) Date of Patent: Jan. 2, 2018

(54) SILANOL-FUNCTIONALIZED COMPOUNDS FOR THE PREPARATION OF POLYURETHANE FOAMS

(75) Inventors: Jared Denis Bender, Coplay, PA (US); Jean Louise Vincent, Bethlehem, PA (US); James Douglas Tobias, Center Valley, PA (US); Mark Leo Listemann, Kutztown, PA (US)

(73) Assignee: Evonik Degussa GmbH, Essen (DE)

( * ) Notice: Subject to any disclaimer, the term of this patent is extended or adjusted under 35 U.S.C. 154(b) by 1488 days.

(21) Appl. No.: 11/236,380

(22) Filed: Sep. 27, 2005

(65) Prior Publication Data
US 2007/0072951 A1 Mar. 29, 2007

(51) Int. Cl.
| | |
|---|---|
| C08J 9/00 | (2006.01) |
| C08G 18/40 | (2006.01) |
| C08G 18/61 | (2006.01) |
| C08G 18/65 | (2006.01) |
| C08K 5/5419 | (2006.01) |
| C08G 101/00 | (2006.01) |

(52) U.S. Cl.
CPC ........ *C08J 9/0061* (2013.01); *C08G 18/4072* (2013.01); *C08G 18/61* (2013.01); *C08G 18/657* (2013.01); *C08K 5/5419* (2013.01); *C08G 2101/005* (2013.01); *C08G 2101/0008* (2013.01); *C08G 2101/0083* (2013.01); *C08J 2375/04* (2013.01); *C08J 2483/00* (2013.01)

(58) Field of Classification Search
USPC ........ 521/112, 114, 117, 128, 129, 134, 170, 521/154, 174
See application file for complete search history.

(56) References Cited

U.S. PATENT DOCUMENTS

| | | | |
|---|---|---|---|
| 3,399,247 A | | 8/1968 | Windemuth et al. |
| 3,539,658 A | * | 11/1970 | Daar et al. .................... 525/100 |
| 4,110,272 A | * | 8/1978 | Kanner et al. ................. 521/111 |
| 4,395,563 A | | 7/1983 | Hayes |
| 4,631,297 A | | 12/1986 | Battice et al. |
| 4,797,501 A | | 1/1989 | Myerly et al. |
| 5,164,423 A | * | 11/1992 | De Genova et al. ......... 521/159 |
| 5,488,125 A | | 1/1996 | Omura et al. |
| 5,650,452 A | | 7/1997 | Thompson et al. |
| 5,668,191 A | * | 9/1997 | Kinkelaar et al. ............. 521/174 |
| 5,708,045 A | | 1/1998 | Thompson et al. |
| 5,985,948 A | * | 11/1999 | Burkhart et al. .............. 521/112 |
| 6,201,035 B1 | * | 3/2001 | Tuinman et al. .............. 521/174 |
| 6,235,804 B1 | | 5/2001 | Frey et al. |
| 6,239,186 B1 | | 5/2001 | Mansfield et al. |
| 6,245,824 B1 | | 6/2001 | Frey et al. |
| 6,316,655 B1 | | 11/2001 | Hall et al. |
| 6,417,310 B1 | | 7/2002 | Omura et al. |
| 6,617,365 B2 | * | 9/2003 | Burkhart et al. .............. 521/112 |
| 2004/0152796 A1 | | 8/2004 | Muller et al. |

FOREIGN PATENT DOCUMENTS

| | | |
|---|---|---|
| EP | 1 095 968 A1 | 5/2001 |
| JP | 60-217247 A | 10/1985 |
| JP | 1226564 A2 | 9/1989 |
| JP | 9263621 A2 | 10/1997 |
| JP | 10087995 | 4/1998 |
| JP | 11-005825 A | 1/1999 |
| JP | 11060676 A2 | 3/1999 |
| JP | 0319436 A2 | 11/2000 |
| JP | 2001-040054 A | 2/2001 |
| JP | 2001-064349 A | 3/2001 |

OTHER PUBLICATIONS

Nelson, G.L., et al., "Silicone Modified Polyurethanes," Proceedings, The 8th Annual BCC Conference on Flame Retardancy, Stamford, CT, pp. 71-87 (1997).

* cited by examiner

*Primary Examiner* — John Cooney
(74) *Attorney, Agent, or Firm* — Andrew H. Chung; Linda S. Li; Jason S. Ngui

(57) ABSTRACT

Methods for preparing polyurethane flexible foam are described, wherein an organic polyisocyanate is reacted with an active hydrogen-containing component such as an organic polyol, in the presence of a urethane catalyst, a blowing agent, optionally a cell opener, and a siloxane-based surfactant composition as a stabilizer for the foam. The siloxane-based surfactant composition comprises a silanol-functionalized organosiloxane having general formula (I),

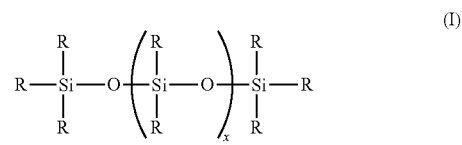

(I)

wherein:
the R groups are independently a $C_1$-$C_3$ alkyl, phenyl, or —OSi(R)$_3$; provided that at least one R group is a hydroxyl (—OH) bonded directly to any silicon atom and X is an integer from 0-200.

29 Claims, No Drawings

SILANOL-FUNCTIONALIZED COMPOUNDS FOR THE PREPARATION OF POLYURETHANE FOAMS

BACKGROUND OF THE INVENTION

The invention relates to polyurethane foams and, more specifically, to processes for making polyurethane flexible foams using silicone-based surfactants as cell stabilizers. In particular, processes for making polyurethane foams using a silanol-based surfactant system as a stabilizer for the foam are disclosed.

Polyurethane foams and their preparations are well known in the art, having applications in a wide variety of areas. Typically, polyurethane (PU) foams are produced by reacting a polyisocyanate with compounds containing two or more active hydrogens, generally in the presence of blowing agent(s), catalysts, silicone-based surfactants and other auxiliary agents. The active hydrogen-containing compounds are typically polyols, primary and secondary polyamines, and water. Two major reactions are promoted by the catalysts among the reactants during the preparation of polyurethane foam, gelling and blowing. These reactions must proceed simultaneously and at a competitively balanced rate during the process in order to yield polyurethane foam with desired physical characteristics.

Reaction between the isocyanate and the polyol or polyamine, usually referred to as the gel reaction, leads to the formation of a polymer of high molecular weight. This reaction is predominant in foams blown exclusively with low boiling point organic compounds. The progress of this reaction increases the viscosity of the mixture and generally contributes to crosslink formation with polyfunctional polyols. The second major reaction occurs between isocyanate and water. This reaction adds to urethane polymer growth, and is important for producing carbon dioxide gas which promotes foaming. As a result, this reaction often is referred to as the blow reaction. The blow reaction is essential for avoiding or reducing the use of auxiliary blowing agents.

A superior quality flexible molded foam displays several important characteristics. It will have good bulk, vent, and shear stability which implies the foam has a small, uniform cellular structure throughout the interior of the foam. These foams will also display good surface stability, defined as having a layer of fine cells adjacent to the outer surface of the foam, and good dimensional stability (i.e., exhibit a reduced tendency to shrink after being removed from the mold). Foams that are less susceptible to shrinkage will be easier to process, require less mechanical crushing which can weaken the physical integrity of the polyurethane, and have lower scrap and repair rates. Superior quality non-molded flexible foams primarily require good bulk dimensional stability, which if absent will lead to foam collapse or severe densification. Reducing the overall emission of additives from a flexible foam [Volatile Organic Compounds, "VOCs"] is also desirable, particularly in car interior applications where automotive windshield fogging can be a problem. For example, one of the main components of VOCs evaporating from flexible molded foams is the amine catalyst.

The manufacturing equipment and chemicals have an important effect on the quality of the foam; however, the surfactant is often one of the most critical components of the formulation as it has a direct and significant influence on the bulk, vent, shear, surface, and dimensional stability as well as the emissions of the foam. In the past, chemical strategies for selecting formulation variables in order to optimize bulk, shear, vent, surface, and dimensional stability have been successful for many polyurethane foam applications. Key variables include the judicious selection of surfactants and catalysts, and the incorporation of cell opening polyols.

The foam industry is now facing cost reduction issues, and is challenged with maintaining foam physical properties while at the same time reducing their raw materials and processing costs. Approaches have included reducing foam density by incorporating more water in the formulation or injecting liquid carbon dioxide, lowering the amount of relatively expensive graft copolymers, using blends of TDI/MDI, and incorporating isocyanate terminated prepolymers. All of these approaches have placed increasing challenges on the accompanying additives, particularly in terms of maintaining foam dimensional stability.

The surfactant composition utilized in the polyurethane foam is often one of the most critical components of the formulation as it has a direct and significant influence on the overall dimensional stability as well as the volatile emissions of the foam. One such strategy to provide a foam having open cells is to employ a silicone-based surfactant, such as polydimethylsiloxane (PDMS) fluids and/or organomodified PDMS fluids to stabilize the foam until the product-forming chemical reaction is sufficiently complete so that the foam is self-supporting and does not suffer objectionable collapse. Additionally, the silicone surfactant should help provide open foam at the end of the foaming process, this being particularly critical when producing HR foams. Examples of such silicone-based surfactants are short polydimethylsiloxane surfactants having from about two to about seven siloxane units. This type of surfactant is generally of low molecular weight and mobile thus stabilizing the foam without closing the cell structure. A drawback associated with the use of this type of surfactant is that when forming components such as, for example, foam seats, headliners, sun visors, etc., employing a polyurethane foam based on this type of surfactant, the unreacted low molecular weight surfactant will volatize from the polyurethane foam and subsequently deposit on, for example, the car windows, as an oily film. This, in turn, scatters light resulting in poor lighting conditions for the driver. It would therefore be desirable to employ a siloxane-based surfactant which provides adequate bulk, vent, surface and dimensional stability to polyurethane foam systems but is also retained within the foam at elevated temperatures, thereby producing polyurethane foams having reduced VOC emissions while imparting excellent physical properties without substantially closing (tightening) the cells of the polyurethane foam.

Accordingly, a number of varied approaches to the development and use of alternative silicone surfactants in polyurethane foam production have been advanced. In U.S. Pat. Nos. 6,245,824; 6,235,804 and 4,797,501 the use of siloxane-oxyalkylene copolymers (silicone polyether) surfactants as foam stabilizers for the preparation of polyether based flexible polyurethane foam is illustrated. These patents suggest the use of silicone copolymers functionalized with polyethers as the active compounds in polyurethane surfactant blends.

Nelson, et al, "Silicone Modified Polyurethanes", Proceedings, The 8th Annual BCC Conference on Flame Retardancy, Stamford, Conn. (1997) reported utilizing difunctional polydimethylsiloxanes bearing carbinol and silanol groups to increase the fire-retardancy of polyurethane elastomers. These difunctional PDMSs differed from the other silicone-based surfactants in several ways. First, the functionalized polydimethylsiloxanes described previously in the art were used as the main component in the formation of polyurethane elastomers. Secondly, the functionalized siloxanes were used to increase the flame retardancy of solid polyurethane elastomer systems.

U.S. Pat. No. 6,239,186 discloses the use of particular siloxane oligomers as foam stabilizers for the production of open cell polyurethane foam. These organosiloxanes were polydimethylsiloxane surfactants with a narrow molecular weight distribution, the use of which resulted in stabilized, open-cell polyurethane (PU) foams.

U.S. Patent Publication 2004/0152796 disclosed the use of hydroxyalkyl- or carbinol terminated siloxanes as surfactants for the production of low emission polyurethane foam. This disclosure focuses on the use of siloxanes bearing carbinol (COH) functionalities as the active surfactant component in the production of low/reduced VOC emission polyurethane foam.

Thus, there still exists a need for highly efficient foam stabilizing compositions comprising low-emission, silanol-containing organosiloxanes, which can be used alone or in combination with other polymeric siloxane fluids, to produce open cell polyurethane foams having reduced VOC emissions.

BRIEF SUMMARY OF THE INVENTION

The present invention provides a novel, highly efficient polyurethane foam stabilizing composition comprising a silanol-containing organosiloxane, that can be used alone or in combination with polydimethylsiloxane (PDMS) fluid, to produce open cell polyurethane foam with good dimensional stability and reduced VOC emissions. As such, this invention involves the use of silanol-functionalized organosiloxanes (organosiloxanes bearing hydroxyl groups directly bonded to the silicon atoms of the siloxane backbone) as active components in the polyurethane foam surfactant composition. Such silanol-based organosiloxanes have from about 1 to about 200 siloxane repeat units and may be linear, branched or cyclic structures. Moreover, such silanol-based organosiloxanes may also contain aliphatic polyether, aliphatic fluorinated or aliphatic perfluorinated groups.

This invention affords surfactant compositions containing a silanol-functionalized organosiloxane as highly efficient bulk stabilizers with surface cell regulatory activity, and as such provides a method for making polyurethane foam from such silanol-based surfactant compositions which exhibits good dimensional stability and reduced volatile siloxane emissions as compared to foams prepared from silicone polyether surfactants.

The method of the invention for preparing polyurethane flexible foams uses a composition which comprises one or more particular, silanol-based surfactants. In particular, the method comprises contacting an organic polyisocyanate and one or more active hydrogen-containing compounds, especially polyols, in the presence of a urethane catalyst composition, a blowing agent, and an effective amount of a siloxane-based surfactant composition, i.e., an amount effective for providing a foam having acceptable dimensional stability.

DETAILED DESCRIPTION OF THE INVENTION

The present invention broadly relates to a process for making polyurethane foams having reduced VOC emissions. This invention is especially suitable for making semiflexible and flexible polyurethane foams using the one shot foaming, quasi-prepolymer and the pre-polymer processes.

Accordingly, the present invention provides semiflexible and flexible polyurethane foams obtained from a polyurethane foam-forming reaction mixture comprising an isocyanate component, an active hydrogen-containing component, and a silicone-based surfactant composition comprising a silanol-based organosiloxane as a stabilizer for the foam in the presence of a blowing agent, preferably water alone or in combination with other blowing agents, and catalyst and optional crosslinkers.

In one aspect of the present invention, a process for preparing a polyurethane foam, such as a flexible polyurethane foam, is provided, comprising contacting at least one polyisocyanate with an active hydrogen-containing compound in the presence of a urethane catalyst, a blowing agent, and a low-emission, siloxane-based (silanol-containing) surfactant composition. The siloxane-based surfactant composition comprises a silanol-functionalized organosiloxane of general formula (I),

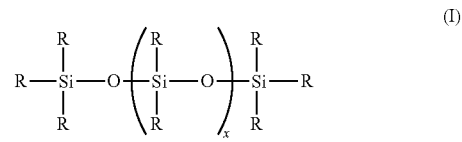

wherein:

the R groups are independently a $C_1$-$C_3$ alkyl, phenyl, or —OSi(R)$_3$; provided that at least one R group is a hydroxyl (—OH) bonded directly to any silicon atom and X is an integer from 0-200, preferably from 1-60, and most preferred from 1-25. Desirably the R groups are methyl, provided that at least one R is —OH. The silanol-based organosiloxane may have 1 to 10 hydroxyls, or 1 to 5 hydroxyls, or especially about 2 hydroxyls, bonded directly to silicon atoms in the average polymeric structure.

As used herein, "C1-C3" means any one of an alkyl group having from 1 to 3 carbon atoms, such as C1, C2, or C3, as well as ranges between any two of these values, for example, C1-C2 and C2-C3. Examples of such alkyls include methyl, ethyl, n-propyl, and isopropyl.

Included within the silanol-functionalized organosiloxane molecules shown in formula (I) are those branched structures which contain silanol (SiOH) groups and are known by those skilled in the art as MT-resins and MQ-resins. Examples of silanol-functionalized organosiloxane molecules are depicted below.

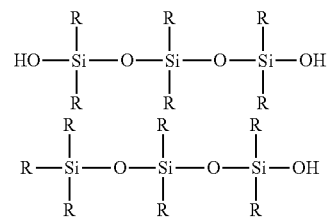

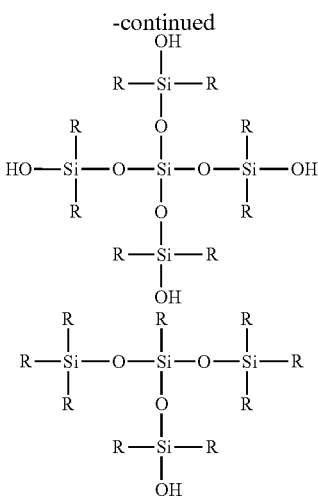

where the R groups are independently a $C_1$-$C_3$ alkyl or phenyl.

In yet another aspect of the present invention, a polyurethane foam composition prepared by mixing a polyol, a polymer polyol, a siloxane-based surfactant composition comprising a silanol-functionalized organosiloxane having from about 1 to about 200 siloxane repeat units, a blowing agent, and a urethane catalyst is provided, wherein the polyurethane foam composition has an Isocyanate Index value of from about 60 to about 120.

While compositions and methods are described in terms of "comprising" various components or steps, the compositions and methods can also "consist essentially of" or "consist of" the various components and steps.

Silanols

The silanol-functionalized organosiloxanes useful in the present invention can be made according to the syntheses disclosed in U.S. Pat. Nos. 6,316,655; 6,417,310; 5,488,125 and 4,395,563. Silanol-functionalized organosiloxanes are commercially available from Gelest, Dow Corning and GE Silicones.

The present invention provides a highly efficient polyurethane foam stabilizing composition comprising a low-emission, silanol-containing organosiloxane, that can be used alone or in combination with polydimethylsiloxane fluid, to produce open cell polyurethane foam with reduced VOC emissions. The invention is a method for preparing polyurethane foam using a composition which comprises a particular class of silanol-functionalized organosiloxane polyurethane foam surfactants. The method of foam preparation consists of reacting an organic isocyanate and a polyol in the presence of a catalyst composition, and a silanol-functionalized organosiloxane composition and optionally a cell opening agent.

The silanol-functionalized organosiloxane compounds described herein can be used as surfactants in the polyurethane compositions and processes for making such compositions in amounts from about 0.00001 to about 5 pbw (parts by weight), and typically in amount from about 0.0001 to about 2 pbw. Optionally, the silanol-functionalized organosiloxane compounds can be used in an amount from about 0.001 pphpp to about 1 pphpp, and more typically in an amount from about 0.001 pphpp to about 0.5 pphpp (pphpp=weight parts per hundred weight parts polyol).

Silanol-functionalized organosiloxane compounds can be used as such or dissolved in solvents such as glycols, fatty alcohols, aliphatic or aromatic hydrocarbons, or polyethers. These silanol-based organosiloxane surfactant compositions can be also used in combination with organosiloxane fluids as described in U.S. Pat. No. 6,239,186. When used in such combinations the silanol-functionalized organosiloxanes may compose about 0.1-100 wt %, preferably about 0.2-40 wt % of the total surfactant composition on an actives basis.

As used herein, the term "silanol-functionalized organosiloxane" refers to siloxanes containing hydroxyl groups (OH) bonded directly to silicon atoms, especially those which have the ability to act as highly efficient and low-emission surfactants for the production of polyurethane foams.

The silanol-functionalized organosiloxane surfactant compositions according to the invention are employed in the manufacture of polyether and polyester polyurethane foams in the manner known to the art. Polyurethane foams are intended to include slabstock and molded foams, viscoelastic, semi-flexible (semi-rigid) and high resiliency (HR) foams, as these terms are known in the art. Silanol-functionalized organosiloxane surfactant compositions may also be extended to the production of rigid foams by those skilled in the art. In producing the polyurethane foams using these surfactant compositions, one or more polyether or polyester polyols are reacted with a polyisocyanate to provide the urethane linkage. In the present invention the polyol composition may comprise one or more of such polyols.

Polyisocyanates

The polyisocyanates that are useful in the polyurethane foam formation process of this invention are organic polyisocyanate compounds that contain at least two isocyanate groups and generally will be any of the known aromatic or aliphatic polyisocyanates. Suitable organic polyisocyanates include, for example, the hydrocarbon diisocyanates, (e.g. the alkylene diisocyanates and the arylene diisocyanates), such as methylene diphenyl diisocyanate (MDI) and 2,4- and 2,6-toluene diisocyanate (TDI), as well as known triisocyanates and polymethylene poly(phenylene isocyanates) also known as polymeric or crude MDI. For semiflexible and flexible foams, the preferred isocyanates generally are, e.g., mixtures of 2,4-TDI and 2,6-TDI in proportions by weight of about 80% and about 20%, respectively, and also about 65% and about 35%, respectively; mixtures of TDI and polymeric MDI, preferably in the proportion by weight of about 80% TDI and about 20% of crude polymeric MDI to about 5% TDI and about 95% crude polymeric MDI; and all blends of polyisocyanates of the MDI type.

The amount of polyisocyanate included in the foam formulations used relative to the amount of other materials in the formulations is described in terms of "Isocyanate Index". "Isocyanate Index" means the actual amount of polyisocyanate used divided by the theoretically required stoichiometric amount of polyisocyanate required to react with all the active hydrogen in the reaction mixture multiplied by one hundred (100). The Isocyanate Indexes in the reaction mixtures used in the process of this invention generally are between about 60 and about 120. More usually, the Isocyanate Index is: for flexible TDI foams, typically between about 85 and about 120; for molded TDI foams, normally between about 90 and about 105; and for molded MDI foams most often between about 70 and about 90.

Polyols

Active hydrogen-containing compounds for use with the foregoing polyisocyanates in forming the polyurethane foams of this invention can be any of those organic compounds having at least two hydroxyl groups such as, for example, polyols. Polyols which are useful in the process of the invention for making a polyurethane foam, particularly via the one-shot foaming process, are any of the types presently employed in the art for the preparation of flexible slabstock foams, flexible molded foams and semiflexible foams. The polyols, e.g., polyether polyols and polyester polyols, ordinarily have hydroxyl numbers in the range of from about 15 to about 700. The hydroxyl numbers are typically between about 100 to about 300 for semiflexible foams and between about 20 to about 60 for flexible foams. For flexible foams, the typical functionality i.e., the average number of hydroxyl groups per molecule of polyol, of the polyols is about 2 to about 4 and, in another aspect of the present invention, about 2.3 to about 3.5.

Polyols which can be used herein, either alone or in admixture, can be any of the following non-limiting classes:
a) polyether polyols derived from the reaction of polyhydroxyalkanes with one or more alkylene oxides, e.g., ethylene oxide, propylene oxide, etc.;
b) polyether polyols derived from the reaction of high-functionality alcohols, sugar alcohols, saccharides and/or high functionality amines, if desired in admixture with low-functionality alcohols and/or amines with alkylene oxides, e.g., ethylene oxide, propylene oxide, etc.;
c) polyether polyols derived from the reaction of phosphorus and polyphosporus acids with alkylene oxides, e.g., ethylene oxide, propylene oxide, etc.;
d) polyether polyols derived from the reaction of polyaromatic alcohols with alkylene oxides, e.g., ethylene oxide, propylene oxide, etc.,
e) polyether polyols derived from the reaction of ammonia and/or an amine with alkylene oxides, e.g., ethylene oxide, propylene oxide, etc.
f) polyester polyols derived from the reaction of a polyfunctional initiator e.g., a diol, with a hydroxycarboxylic acid or lactone thereof e.g., hydroxycaproic acid or caprolactone;
g) polyoxamate polyols derived from the reaction of an oxalate ester and a diamine, e.g., hydrazine, ethylenediamine, etc. directly in a polyether polyol;
h) polyurea polyols derived from the reaction of a diisocyanate and a diamine, e.g., hydrazine, ethylenediamine, etc. directly in a polyether polyol.

In addition to the polyether and polyester polyols, the masterbatches, or premix compositions, frequently contain a polymer polyol. Polymer polyols are used in flexible polyurethane foam to increase the foam's resistance to deformation, i.e. to increase the load-bearing properties of the foam. Currently, two different types of polymer polyols are used to achieve load-bearing improvement. The first type, described as a graft polyol, has a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise about 4 to about 80% of the polyol portion of the masterbatch.

For flexible foams, typical types of alkylene oxide adducts of polyhydroxyalkanes are the ethylene oxide and propylene oxide adducts of aliphatic trihydroxyalkanes.

Grafted or polymer polyols are used extensively in the production of flexible foams and are, along with standard polyols, one of the preferred class of polyols useful in forming the polyurethane foams of this invention. Polymer polyols are polyols that contain a stable dispersion of a polymer, for example in the polyols (a) to (e) above. In one aspect of the invention, the polymer polyols are the polyols of type (a). Other polymer polyols useful in the process of this invention are polyurea polyols and polyoxamate polyols.

Blowing Agent

Although any of the typically used blowing agents can be used alone or in combination in practicing the present invention, water is generally used as a reactive blowing agent in flexible foams. In the production of flexible slabstock foams, water generally can be used in concentrations of, e.g., between about 1.5 to about 6.5 parts per hundred parts of polyol (phpp), and more often between about 2.5 to about 5.5 phpp. Water levels for TDI molded foams normally range, e.g., from about 3 to about 4.5 phpp. For MDI molded foam, the water level, for example, is more normally between about 2.5 and about 5 phpp. However, as one skilled in the art would readily appreciate, the water level is typically set in accordance with the desired foam density. Suitable levels of blowing agent are known to the skilled person. For example, high density semiflexible polyurethane foams, the water level can be as low as about 0.2 pphpp. Physical blowing agents such as, for example, blowing agents based on volatile hydrocarbons or halogenated hydrocarbons and other non-reacting gases can also be used in the production of polyurethane foams in accordance with the present invention. In the production of flexible slabstock foams, water is the main blowing agent; however, other blowing agents can be used as auxiliary blowing agents. For flexible slabstock foams, the preferred auxiliary blowing agents are carbon dioxide and dichloromethane (methylene chloride). Other blowing agents which can also be used in accordance with the present invention include but are not limited to chlorofluorocarbons (CFCs), hydrofluorocarbons (HFCs), hydrochlorofluorocarbons (HCFCs), and non-fluorinated organic blowing agents, e.g., liquid carbon dioxide, pentane and acetone.

Catalysts

Catalysts that can be used for the production of the polyurethanes include, but are not limited to, urethane catalysts, delayed action catalysts, tertiary amines of both the non-reactive and reactive types, amino urethane catalysts, organometallic and/or organometallic urethane catalysts, and mixtures thereof. Suitable urethane catalysts useful in the present invention include, but are not limited to, triethylenediamine (TEDA), N-methylimidazole, 1,2-dimethylimidazole, N-methylmorpholine, N-ethylmorpholine, triethylamine, tributylamine, pentamethyldiethylenetriamine, pentamethyldipropylene-triamine, triethanolamine, dimethylethanolamine, and bis(dimethylaminoethyl)ether, as well as mixtures thereof. Reactive amine catalysts (also known as non-fugitive catalysts) are compounds which contain one or more active hydrogens and, as a consequence, can react with the isocyanate and be chemically bound in the polyurethane polymer matrix. For the production of flexible slabstock and molded foams, typically, the amine catalysts are bis(N,N-dimethylaminoethyl)ether and TEDA. Metal salt catalysts also can and often are used in polyurethane foam formulations. Metal salt catalysts suitable for use herein include, but are not limited to, organotins such as stannous octoate, stannous acetate, stannous oleate, stannous laurate, dibutyltin dilaurate, and other such tin salts. Metal salt catalysts are ordinarily used in small amounts in polyurethane formulations, e.g., in amounts ranging from about 0.001 to about 0.5 weight parts per hundred weight parts polyol (pphpp).

Misc. Additives

Various additives can also be employed in preparing the foam which serve to provide different properties. Crosslinking agents or chain lengthening agents having at least two hydrogen atoms, capable of reacting with the isocyanates, can be added to the reaction mixture, e.g., compounds having hydroxyl and/or amino and/or carboxyl groups. Fillers, e.g., clay, calcium sulfate, barium sulfate, ammonium phosphate, etc., can be added to lower cost and imparts specific physical properties. Dyes can be added for color and fibrous glass or synthetic fibers can be added for strength. In addition, plasticizers, deodorants, foam-stabilizing agents, pigments, stabilizers against aging and weathering, flame retardants, and fungistatic and bacteriostatic agents can be added.

Crosslinkers which may be used in the production of polyurethane foams are typically small molecules, usually less than 350 molecular weight, which contain active hydrogens for reaction with the isocyanate. The functionality of a crosslinker is greater than 3, and in another aspect of the present invention, between 3 and 5. The amount of crosslinker used can vary between about 0.1 pphpp and about 20 pphpp and the amount used is adjusted to achieve the required foam stabilization or foam hardness. Examples of crosslinkers include, but are not limited to, glycerin, diethanolamine, triethanolamine and tetrahydroxyethylethylenediamine.

Chain extenders which can be employed in the present invention include, but are not limited to, 1,4-butanediol 1,6-hexanediol, 1,8-octanediol, 1,9-nonadiol, 1,10-decanediol, 1,4-cyclohexane dimethanol, p-xyleneglycol, 1,4-bis(2-hydroxyethoxy)benzene and 1,12-dodecanediol. In another aspect of the present invention, 1,4-butanediol is used as a chain extender.

Process

Temperatures useful for the production of polyurethanes vary depending on the type of foam and specific process used for production as well understood by those skilled in the art. Flexible slabstock foams are usually produced by mixing the reactants generally at an ambient temperature of between about 20° C. and about 40° C. The conveyor on which the foam rises and cures is essentially at ambient temperature, which temperature can vary significantly depending on the geographical area where the foam is made and the time of year. Flexible molded foams usually are produced by mixing the reactants at temperatures between about 20° C. and about 30° C. The mixed starting materials are fed into a mold typically by pouring. The mold is heated, for example, to a temperature between about 20° C. and about 70° C. In another aspect of the present invention, the mold is heated to a temperature between about 40° C. and about 65° C.

A process which can be used for the production of flexible slabstock foams and molded foams in accordance with the present invention is the "one-shot" process or the quasi prepolymer process. In the "one-shot" process or the quasi prepolymer process, the starting materials are mixed and reacted in one step.

A brief description of the one-shot and prepolymer method can be found in US2004/0152796: The "one-shot process" for making polyurethane foam is a one-step process in which all of the ingredients necessary (or desired) for producing the foamed polyurethane product including the polyisocyanate, the organic polyol, water, catalysts, surfactant(s), optional blowing agents and the like are simply blended together, poured onto a moving conveyor or into a mold of suitable configuration and cured. The one shot process is to be contrasted with the prepolymer process wherein a liquid prepolymer adduct of a polyisocyanate and a polyol normally having terminal isocyanate groups first is prepared in the absence of any foam-generating constituents and then the prepolymer is reacted with water in the presence of catalyst in a second step to form the solid urethane polymer.

In accordance with one aspect of the present invention, a general polyurethane flexible foam formulation having a density in the range from about 1 lb/ft$^3$ to about 3.75 lb/ft$^3$ (about 16 kg/m$^3$ to about 60 kg/m$^3$) having an organosiloxane cell stabilizer comprises the following components, in parts by weight (pbw):

| Flexible Foam Formulation Component | Amount (pbw) |
| --- | --- |
| Polyol | 20-100 |
| Polymer polyol | 80-0 |
| Silanol-based cell stabilizer | 0.00001-3.0 |
| Cell opener | 0-3 |
| Blowing agent (e.g., H$_2$O) | 2-4.5 |
| Crosslinker | 0.5-2 |
| Catalyst | 0.3-2 |
| Isocyanate Index | 60-120 |

EXAMPLES

In the Examples and Tables described herein, the following materials were used:

Polyether Polyol from Dow Chemical, OH#=21
Polymer Polyol from Dow Chemical, OH #=31
DABCO 33-LV® catalyst from Air Products and Chemicals, Inc. (APCI)
DABCO® BL-11 catalyst from APCI
DABCO® DC 6070 silicone polyether surfactant from APCI
DABCO DC 5169 silicone polyether surfactant from APCI
DABCO DC 5164 silicone polyether surfactant from APCI
DMS-S14 disilanol functionalized PDMS (DP=17) from Gelest
Mondur TD80 toluene diisocyanate from Bayer In the following examples the cell stabilizers used in the production of polyurethane foams A, B and D were siloxane polyether copolymers (polyoxyalkylene siloxanes) while the cell stabilizer used in the production of polyurethane foams C and E was a 0.50 wt % solution in polypropylene glycol mono butyl ether of DMS-S14, a disilanol functionalized polydimethylsiloxane having a degree of polymerization (DP) of 17 corresponding to X=15 in formula (I).

Example 1

Table 1 below illustrates the formulation components used in the production of polyurethane foam formulations A-C. Polyurethane foams A-C were made using a hand-mix technique familiar to those skilled in the art. The surfactant and polyols were placed in a 1.9 liter cup and mixed at about 6000 rpm for about 25 seconds. Next, the amine pre-blend was added to the cup, and the contents were mixed for about 20 seconds. The TDI was added and mixed with the rest of the contents in the cup for about 5 seconds. Finally, the reaction mixture was poured into a 9.44 dm³ mold that was temperature controlled to about 68° C. A sufficient amount of the reaction mixture was used such that the final foam pad had an overall density of about 31.5 kg/m³. The foam was removed from the mold after about 240 seconds and tested for initial force to crush (FTC) 30 seconds after demold. Shrinkage was determined by a method described by Herrington, Hoch et al, "Flexible Polyurethane Foams"; The Dow Chemical Company, 1997, where uncrushed molded foam pads were allowed to stand at ambient temperature overnight. The shrunken pads were then cut through the area of maximum shrinkage and the remaining thickness is measured and reported as a percentage of the original foam thickness. The results are shown in Table 2.

TABLE 1

Formulations of Foams A-C

| Component | Amount (pphpp) |
|---|---|
| Polyol | 72 |
| Polymer Polyol | 28 |
| DABCO 33-LV ® | 0.32 |
| DABCO ® BL-11 | 0.08 |
| Water | 4.1 |
| Diethanolamine | 1.5 |
| Cell Stabilizer | 0.6 |
| TDI Index | 100 |

Experimental formulations A-C show that the use of silanol-functionalized organosiloxane blends (SiOH) in the production of polyurethane foams results in a more open foam with reduced FTC and shrinkage values as compared to commercial silicone-polyether based surfactants. The data also shows that a drastic reduction in siloxane emissions is achieved when using low-emission silanol-functionalized surfactant compositions within the scope of this invention compared to commercial silicone surfactants.

TABLE 2

Shrinkage and FTC comparison of Formulations A-C

| Formulation | Cell Stabilizer | % Shrinkage | FTC (lbf) | Relative Siloxane emissions |
|---|---|---|---|---|
| A | DABCO ® DC 5169/DC 5164 (3/1) | 56 | 215 | 1.00 |
| B | DABCO ® DC 6070 | 55 | 192 | 0.88 |
| C | DMS-S14 Solution | 25 | 175 | 0.22 |

Example 2

Table 3 below illustrates the formulation components used in the production of polyurethane foam formulations D-E. Polyurethane foams D-E were made on a Hi-Tech high pressure foam machine. The resin "B side" components were mixed and placed in a 5.5 gallon (20.8 L) tank which was agitated and maintained at about 72° F. (22° C.) under about 2.2 bar of nitrogen pressure. The TDI "A side" component was also contained in a 5.5 gallon (20.8 L) tank which was agitated and maintained at about 72° F. (22° C.) at about 2.2 bar of nitrogen pressure. Before a shot was made into a mold, material was first circulated through the lines and mixhead and back to the tanks to provide a uniform temperature throughout the mixing line. During the shot, hydraulic pistons were raised which allowed the resin and TDI components to mix via high pressure impingement mixing. The material from the mixhead was directed into a mold to produce a flexible molded pad. Molds were maintained at about 155° F. (68° C.) via a hot water circulation system incorporated into the mold design. The foam was removed from the mold after about 240 seconds and tested for initial force to crush (FTC) 30 seconds after de-mold. Airflows were measured on crushed, fully cured foam pads, with higher values indicating more open foam. Relevant physical property data for examples D-E appear in Table 4.

TABLE 3

Formulations of Foams D-E

| Component | Amount (pphpp) |
|---|---|
| Polyol | 56 |
| Polymer Polyol | 44 |
| DABCO 33-LV ® | 0.32 |
| DABCO ® BL-11 | 0.08 |
| Water | 2.75 |
| Diethanolamine | 1.5 |
| Cell Stabilizer | 0.6 |
| TDI Index | 100 |

Physical property data obtained from Hi-tech polyurethane foams (examples D-E) using higher density formulations gave rise to similar open foam trends as seen in examples D-E. The results summarized in Tables 2 and 4 indicate the efficiency of the low-emission silanol-functionalized organosiloxane compositions described within this invention in the production of low-emission, dimensionally stable polyurethane foams.

TABLE 4

Physical Properties of Polyurethane Foams D and E

| Formulation | Cell Stabilizer | Density (kg/m³) | FTC (lbf) | Airflow (ft³/min) |
|---|---|---|---|---|
| D | DABCO ® DC 6070 | 46.67 | 230 | 2.78 |
| E | DMS-S14 Solution | 46.67 | 203 | 2.20 |

The invention claimed is:

1. A method for preparing a polyurethane foam which comprises contacting at least one polyisocyanate; at least one polyol; at least one catalyst; at least one blowing agent; and at least one surfactant composition comprising at least one organosiloxane of formula (I),

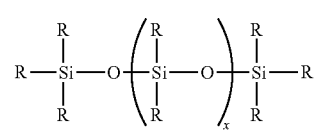

wherein: the R groups are $C_1$-$C_3$ alkyl and hydroxyl (—OH); provided that one R group is a hydroxyl bonded directly to any silicon atom and X is an integer form 1-200 and the organosiloxane is present in an amount of about 0.001 to about 0.5 pphpp.

2. The method of claim 1 in which the organosiloxane is linear.

3. The method of claim 1 in which the polyol is a polyether polyol, a polyester polyol, or mixtures thereof.

4. The method of claim 1 in which the C1-C3 alkyl is methyl.

5. The method of claim 4 in which the blowing agent comprises water.

6. The method of claim 5 in which X is an integer from 1 to 60.

7. A method for preparing an open celled polyurethane foam which comprises reacting a reaction mixture comprising at least one polyisocyanate; at least one polyol; at least one blowing agent; and at least one surfactant composition in the presence of at least one tertiary amine catalyst; wherein the surfactant composition comprises at least one organosiloxane of formula (I)

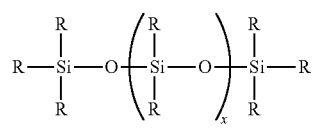

wherein: the R groups are methyl, and hydroxyl (—OH); provided that at least one R group is a hydroxyl bonded directly to any silicon atom and X is an integer from 1-25 and the organosiloxane is present in an amount of about 0.001 pphpp to about 0.5 pphpp.

8. The method of claim 7 in which the polyol is a polyether polyol, a polyester polyol, or mixtures thereof.

9. The method of claim 7 in which the blowing agent comprises water.

10. An open celled polyurethane foam, obtained from a foam-forming reaction mixture containing a polyisocyanate, polyester and/or polyether polyol, a blowing agent comprising water and an effective amount of a stabilizer for the foam, wherein the stabilizer comprises a organosiloxane composition of general formula (I),

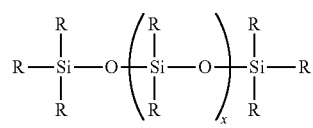

wherein: the R groups are methyl, and hydroxyl (—OH); provided that X is an integer from 1-200, the organosiloxane having 1 to 5 hydroxyls bonded directly to silicon atoms and the amount of organosiloxane is present in an amount of about 0.001 pphp to about 0.5 pphpp, the reaction mixture having an Isocyanate Index of 60 to 100.

11. The method according to claim 7, wherein the organosiloxane is dissolved in solvents selected from the group consisting of glycols, fatty alcohols, aliphatic or aromatic hydrocarbons, and polyethers.

12. The polyurethane foam of claim 10, wherein the shrinkage value is 25%.

13. The method of claim 1 wherein the reaction mixture has an Isocyanate Index of about 60 to about 100.

14. A method for preparing an open celled polyurethane foam which comprises contacting toluene diisocyanate; at least one polyether polyol; water; at least one amine; and at least one organosiloxane wherein the organosiloxane is dissolved in at least one solvent and has from about 1 to about 200 siloxane repeat units of formula (I)

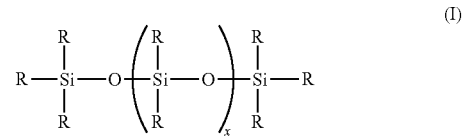

and wherein the R groups are methyl and hydroxyl; provided that one R group is a hydroxyl bonded directly to any silicon atom and X is an integer from 1-60 and the amount of organosiloxane is from about 0.001 to about 0.5 pphpp.

15. The method of claim 1 wherein the catalyst comprises a urethane catalyst.

16. The method of claim 1 wherein the foam has a force to crush value of 175 lbf.

17. The method of claim 1 wherein the foam has a force to crush value of 203 lbf.

18. The method of claim 1 wherein the foam has an airflow rating of 2.20 ft³/min.

19. The method of claim 14 wherein the method comprises combining the siloxane and the polyol, adding the amine, and adding the toluene diisocyanate.

20. The method of claim 1 wherein the surfactant composition further comprises polydimethylsiloxane.

21. The method of claim 1 further comprising at least one crosslinker.

22. The method of claim 1 further comprising at least one cell opening agent.

23. The method of claim 1 wherein the polyisocyanate comprises at least one of MDI and TDI.

24. The method of claim 1 wherein the catalyst comprises at least one tertiary amine.

25. A method for preparing a polyurethane foam which comprises contacting at least one polyisocyanate; at least one polyether polyol; at least one tertiary amine catalyst; water; and a surfactant composition comprising at least one diluent and least one organosiloxane of formula (I),

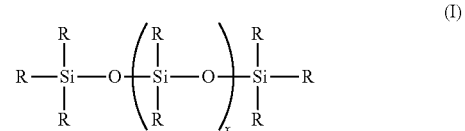

wherein: the R groups are methyl and hydroxyl; provided that, the organosiloxane comprises 1 to 2 hydroxyls bonded directly to silicon atoms and X is an integer from 1-25 and the organosiloxane is used in an amount of about 0.001 to about 0.5 pphpp.

26. The method of claim 25 wherein the diluent comprises at least one of glycols, fatty alcohols, aliphatic or aromatic hydrocarbons and polyethers and the organosiloxane comprises about 0.2 to about 40 wt.% of the surfactant composition.

27. The method of claim 26 wherein the polyol, tertiary amine, water, and surfactant composition are mixed before contacting with the polyisocyanate.

28. The method of claim 26 wherein the contacting comprises mixing the polyisocyanate, polyol, tertiary amine, water and surfactant composition, and supplying a resultant mixture onto a conveyor or into a mold.

29. The method of claim 26 wherein the surfactant composition consists essentially of the diluent and the organosiloxane.

* * * * *